United States Patent [19]

Dressell, Jr. et al.

[11] 4,133,415
[45] Jan. 9, 1979

[54] LINEAR FORCE SHOCK ABSORBER

[76] Inventors: Richard G. Dressell, Jr., 14609 Stonehouse, Livonia, Mich. 48154; Robert J. Heideman, 37780 Westwood Cir., Apt. 101, Westland, Mich. 48185

[21] Appl. No.: 771,415

[22] Filed: Feb. 23, 1977

Related U.S. Application Data

[60] Division of Ser. No. 681,287, Apr. 28, 1976, Pat. No. 4,059,175, which is a continuation-in-part of Ser. No. 574,885, May 6, 1975, abandoned.

[51] Int. Cl.$^2$ .............................................. F16F 9/48
[52] U.S. Cl. ........................................ 188/285; 92/128; 188/287; 188/299; 188/322
[58] Field of Search ............... 188/281, 285, 286, 287, 188/299, 315, 322; 403/364; 339/186 R, 186 M; 92/128, 165 R, 165 PR

[56] References Cited

U.S. PATENT DOCUMENTS

| 2,962,688 | 11/1960 | Werner | 339/186 M |
| 3,344,894 | 10/1967 | Kenworthy | 188/287 |
| 3,425,522 | 2/1969 | Gryglas | 188/315 |
| 3,478,846 | 11/1969 | Germond | 188/287 |
| 3,693,767 | 9/1972 | Johnson | 188/287 |
| 3,840,097 | 10/1974 | Holley | 188/287 |

Primary Examiner—Edward K. Kazenske
Attorney, Agent, or Firm—Krass & Young

[57] ABSTRACT

A shock absorber for providing a linear decelerating force to a machine part by a piston forcing fluid through a series of orifices formed by the coaction of holes in the piston cylinder and grooves formed on the internal diameter of a sleeve which fits over the cylinder. The absorber is constructed with asymmetrical tabs formed on the cylinder in such a manner as to allow the insertion of the piston into the cylinder without any special inserting tools and the asymmetry eliminating the possibility of an improper assembly of the cylinder to a retainer structure.

1 Claim, 14 Drawing Figures

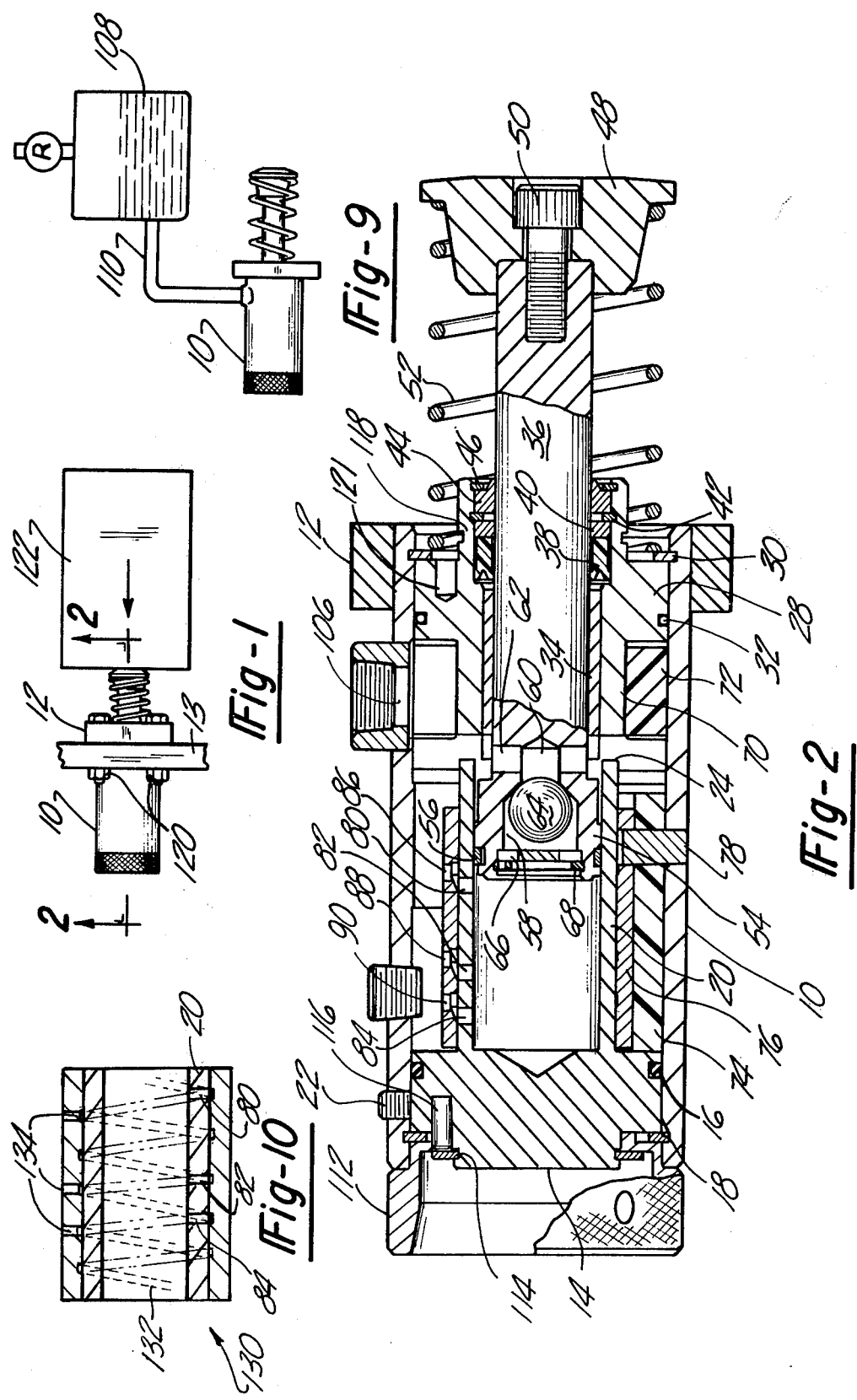

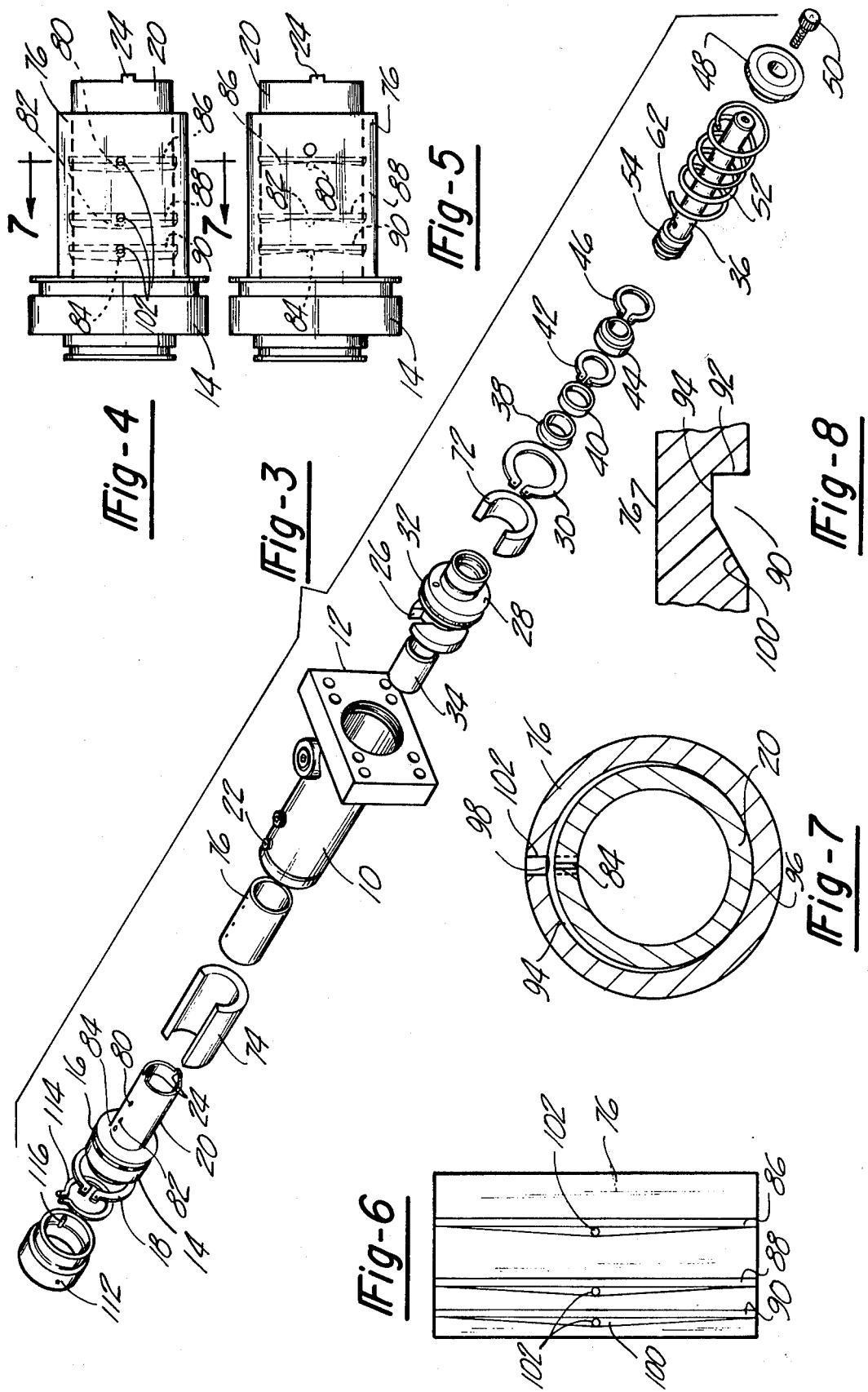

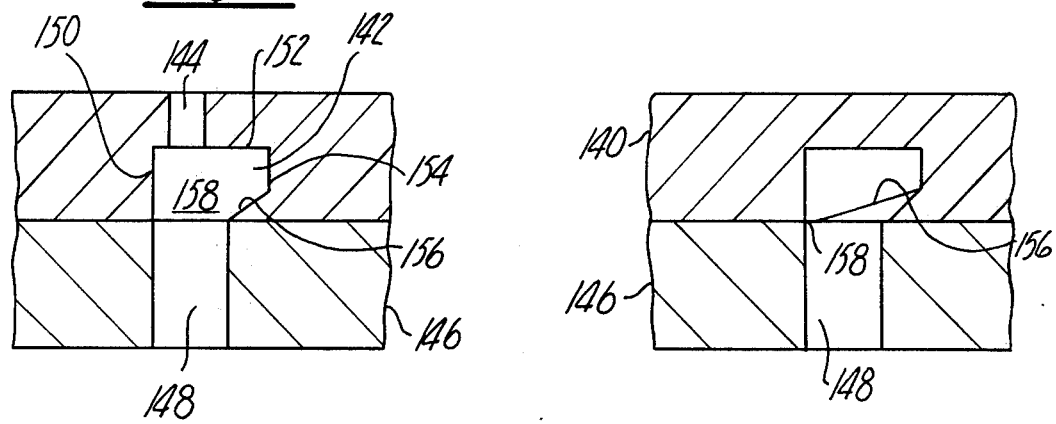
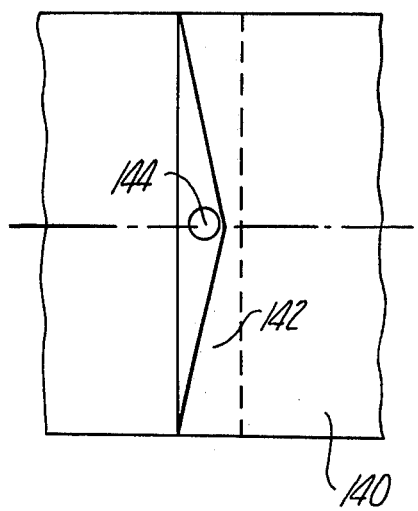
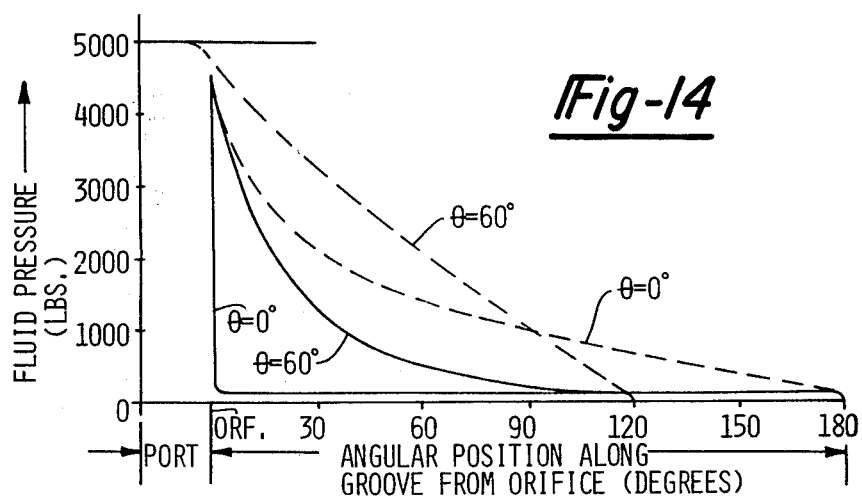

LINEAR FORCE SHOCK ABSORBER

REFERENCE TO RELATED APPLICATIONS

This application is a divisional of Ser. No. 681,287, filed Apr. 28, 1976, now U.S. Pat. No. 4,059,175, which is a continuation-in-part of U.S. Ser. No. 574,885, filed May 6, 1975, now abandoned.

BACKGROUND OF THE INVENTION

1. Field of the Invention

This invention relates to shock absorbers for linearly decelerating a machine part by imposing a relatively constant force to the part over the stroke of the device and more particularly to such a device wherein the constant decelerating force may be adjusted for use with machine parts having differing weights and velocities.

2. Prior Art

Shock absorbers which force fluid through a restricted orifice to convert the kinetic energy of a moving part into an increase in the thermal energy of the fluid are commonly used on machines. The smoothest deceleration of the moving part is obtained by absorbers which offer a constant resistive force to the motion over the total length of the deceleration.

One class of such devices employ a piston connected to the machine part and movable within a cylinder having one closed end. A series of exponentially spaced holes are formed along the length of the cylinder wall and the cylinder is supported within a housing filled with fluid. As the piston is forced into the cylinder by motion of the machine part the fluid is forced through the orifices and the kinetic energy of the part is converted into thermal energy of the fluid. As the piston moves down the cylinder it successively closes off the orifices so that the force imposed on the load is maintained relatively constant resulting in a linear deceleration of the moving part.

The force imposed on the part is a function of the configuration of the fluid orifices, and linear decelerators of this class have been designed wherein the orifice configuration may be varied to accommodate the device for use with parts having varying weight and kinetic energy. One approach to this problem has been to place a tubular sleeve over the cylinder and provide ports in the sleeve that cooperate with the ports in the cylinder to define the fluid orifice. The angular position of the sleeve on the cylinder may thus be adjusted to vary the orifice configuration and the resistance provided to a load. For example, Gryglas U.S. Pat. No. 3,425,522 discloses a hydraulic shock absorber employing a sleeve with a crescent-shaped groove that overlies a metering port in the cylinder.

The present invention is directed to a fluid shock absorber of this general type, but which is provided with a unique orifice arrangement that is advantageous over prior art devices in two important respects. First, the orifice is configured to have a high ratio of width to length in order to maximize turbulent flow through the orifice and thereby minimize the sensitivity of the force required to push the fluid through the orifice to variations in the viscosity of the fluid. Second, the orifice is configured to also have a small area relative to the cross-sectional area of the groove measured at any point along the inner diameter of the tubular sleeve so as to cause a substantial pressure drop when the fluid flows through the orifice into the groove. By lowering the pressure in the groove, the likelihood of fluid leakage between the sleeve and cylinder is minimized.

The shock absorber construction is also such as to greatly simplify the assembly of the unit and to eliminate the possibility of the parts being assembled in incorrect relation.

SUMMARY OF THE INVENTION

The shock absorbers of the present invention are formed with an outer tube which rotatably supports a piston rod bearing retainer at one end. An end cap is rotatably supported in the other end of the tube and a hydraulic cylinder projects inwardly into the tube from the end cap. The cylinder's outer walls are spaced from the tube and a cellular accumulator material fills the space between the tubes. The open end of the cylinder is formed with a pair of projecting ears disposed on opposite edges of the perimeter of the cylinder, and offset on the same side of a diametric line across the cylinder. These asymmetric ears mate with a pair of recesses formed in the piston rod bearing retainer so that when one of these members is rotated with respect to the tube the outer member rotates with it.

The cylinder has a series of circular metering ports formed at exponentially spaced intervals along its length. A piston supported on a rod that projects through the bearing and connects to the machine member to be decelerated is slidable within the cylinder.

A cylindrical sleeve surrounds the outer diameter of the cylinder and contains grooves that overlie the circular cylinder ports and cooperate with them to form fluid orifices. In one form of the invention one groove is provided for each of the cylinder ports and the grooves extend fully around the inner diameter of the sleeve. The radial depth of the groove varies from a maximum depth on one side of the sleeve to a minimum depth at a diametrically opposed point. One wall of each groove extends normally to the sleeve surface and thus makes a radially extending line of intersection with the surface. The opposite wall of each groove is inclined with respect to the central axis of the sleeve so that the groove has the maximum width at the inner diameter of the sleeve. The inclined wall terminates at the bottom of the groove, which has a constant width, so that its line of intersection with the inner diameter of the sleeve varies elliptically along the circumference of the groove as a function of the depth of the groove, and thus the width of the groove at the sleeve inner diameter varies along the circumference of the groove. A single circular fluid port is formed through the wall of the sleeve at the widest and deepest point of each groove and is offset relative to the groove bottom. The relative position of the cylinder port with respect to the groove is such that the port is closed by the sleeve surface when the minimum depth point of the groove overlies the port.

This metering sleeve is locked in place with respect to the outer tube and the interlocked pressure cylinder and bearing retainer may be rotated to control the point on each groove that overlies its corresponding circular port in the cylinder. This controls the metering orifice's configuration and accordingly the resistance provided to movement of the cylinder.

In an alternative form of the invention the grooves are formed in a continuous spiral on the interior of the sleeve with a pitch that is an integral divisor of the longitudinal spacings between the cylinder ports. The grooves are of constant depth. As the cylinder is rotated relative to the sleeve all the grooves are effectively simultaneously moved longitudinally with respect to the ports that they overlie. This form of groove is relatively easy to form.

With either groove configuration the resulting flow path has its minimum cross section, or maximum constriction, formed between the edge of the circular port in the cylinder at its outer diameter and the overlying section of the metering groove at the inside diameter of the sleeve. This maximum constriction represents the fluid orifice. As fluid passes through the orifice it undergoes a substantial pressure drop, causing the remaining flow path through the groove to be at a relatively low pressure. The "depressurization" of the groove minimizes the likelihood of fluid leakage between the cylinder and the sleeve.

Moreover, with grooves of either configuration, the orifice so defined has effectively zero length. This minimum attainable ratio of orifice length to width causes a highly turbulent flow through the orifice. Turbulent flow is insensitive to fluid viscosity, which is a function of fluid temperature. Thus the performance characteristics of the shock absorber do not vary over successive operating cycles as the operating temperature of the fluid increases.

The unit is filled with oil and when the machine part forces the piston down the cylinder the oil is metered through the orifices and into the accumulator material.

A unidirectional valve formed in the piston head provides a low resistance return flow path for fluid when the machine member moves away from the shock absorber allowing a spring to return the piston.

A removable adjustment member may be attached to either the bearing retainer or the end member that supports the cylinder to adjust the two rotationally with respect to the metering sleeve. A lock screw extending through the tubular wall then retains the assembly in place.

The pair of offset ears or tabs on the open end of the cylinder allow the insertion of the piston and its ring into the cylinder without the use of any special ring retaining tools. The piston with its ring is simply forced against the wider space between the edges of the tabs at an inclined angle with respect to the center line of the cylinder and then tilted into alignment with the cylinder and pressed in. The tabs effectively act as a retaining tool for the piston ring during this inserting operation. The offset tabs and the mating offset recesses in the rod bearing retainer cooperate to insure a unique alignment between the cylinder and the sleeve.

Other objectives, advantages and applications of the present invention will be made apparent by the following detailed description of a preferred embodiment of the invention.

The description makes reference to the accompanying drawing in which:

FIG. 1 is a side view of a shock absorber formed in accordance with a first embodiment of the present invention supported on a machine so as to exert decelerating force upon a machine member;

FIG. 2 is a sectional view of the shock absorber taken along line 2—2 of FIG. 1;

FIG. 3 is a perspective exploded view of the shock absorber;

FIG. 4 is a side view of the pressure cylinder and metering sleeve of the shock absorber illustrating a first rotational relationship between the two;

FIG. 5 is a side view of the pressure cylinder and metering sleeve of the shock absorber illustrating a second rotational relationship of the two;

FIG. 6 is a view of the internal diameter of the meter sleeve as it would be seen if it were laid out linearly, illustrating the configuration of the metering grooves;

FIG. 7 is a sectional view through the pressure cylinder and metering sleeve along a groove, taken along line 7—7 of FIG. 4;

FIG. 8 is an enlarged cross-sectional view through a groove in the metering sleeve;

FIG. 9 is a schematic diagram illustrating the manner of attachment of an external accumulator to the cylinder;

FIG. 10 is a sectional view through a second, alternative form of grooved sleeve and the mating cylinder;

FIG. 11 is a sectional view of a third, alternative form of grooved sleeve and mating cylinder illustrating a first rotational relationship between the two;

FIG. 12 is a sectional view of the form of grooved sleeve and mating cylinder of FIG. 11 illustrating a second rotational relationship between the two;

FIG. 13 is a view of the internal diameter of the meter sleeve of FIGS. 11 and 12 as it would be seen if laid out linearly; and FIG. 14 is a graphical representation of fluid pressure in the groove in the metering sleeve comparing prior art groove designs with the groove design of the present invention.

The preferred embodiment of the invention is constructed about a cylindrical outer tube 10. One end of the tube, which will be hereafter termed the forward end, has a radially extending metal flange 12 fixed to its outer diameter for the purpose of attaching the shock absorber to a machine mounting surface, such as the wall 13 of FIG. 1.

The rear end of the tube 10 is closed off by a cylindrical cap 14. An O-ring 16 fitted in a groove of the outer perimeter of the cap 14 bears against the inner wall of the tube 10 to provide a fluid seal. A split steel retaining ring 18 fits in a groove in the inner wall of the tube 10 to secure the cap within a tube.

A tubular metering cylinder 20 is formed integrally with the rear cap 14 and projects forwardly into the tube 10. The outer diameter of the cylinder 20 is substantially smaller than the inner diameter of the tube 10 so that a volume is formed between them.

The rear cap 14 and the cylinder 20 are normally secured against rotation within the tube by releasable fastener means extending through the tube 10, comprised of a set screw 22 which mates with a threaded hole in the wall of the tube, near the rear end, and bears against the outer diameter of the cap 14.

A pair of tabs or ears 24 project outwardly from the forward end of the tube 20. The tabs are not quite diametrically opposed but are displaced from one another by approximately 140° so that a wider spacing separates the two on one side than on their other side. The tabs 24 extend into a pair of radial slots 26 formed in the rear end of a piston rod bearing retainer member 28 which seals the forward end of the tube 10. The retainer 28 is secured within the tube by a split retainer ring 30 fitted in a groove in the inner diameter of the tube 10, near its forward end. An O-ring seal 32 fits in a groove in the outer diameter of the retainer 28.

A cylindrical sleeve bearing 34 is press-fitted within a central cavity in the retainer 28 and acts to slidingly support an elongated piston rod 36 that projects out of the forward end of the assembly. The retainer 28 has a forward cylindrical extension beyond the bearing 34 to accommodate a plastic rod seal 38. The rod seal bears against a shoulder formed in the retainer and is secured by a retainer member 40 which is in turn secured by a retaining ring 42 seated in a groove in the inner diameter of the retainer 28. A plastic rod wiper 44 is secured between the retaining ring 42 and a second retaining ring 46 fitted within another groove in the retainer 28.

At its forward end the piston rod 36 carries a button 48 secured by a screw 50 threaded in a hole at the end of the piston rod. The button acts to bear against a machine part to be controlled by the decelerator. A spiral spring 52 extends between the rear side of the button 48 and the retaining ring 30 and acts to return the piston rod to its normal extended position after the machine part is moved away from the unit.

A piston 54 is formed integrally with the rear end of the rod 36. A groove on the outer diameter of the rear end of the piston carries a piston ring 56 which bears against the inner diameter of the cylinder 20. The piston is formed with a central aperture 58 opening on its rear end and communicating at its forward end with a central cavity 60. That in turn communicates with a radially extending aperture 62. The concave surface between the larger aperture 58 and the smaller aperture 60 acts as a seat for a ball check valve 64. A valve retainer 66 is supported rearwardly of the ball by a retaining ring 68. When the piston moves rearwardly under the influence of a force exerted on the button 48 by a machine part the passage 60 is sealed by the ball 64 and when the piston moves in the forward direction under the force of the return spring 52 a free flow path is established through the passages 58, 60 and 62.

The passage 62 communicates with the slots 26 in the rear end of the forward bearing retainer 28 and through those slots to an annular slot 70 formed in the outer diameter of the retainer. The slot 70 is filled with an annular accumulator pad 72 formed of a cellular plastic filled with nitrogen to give it a high degree of resilience. A similar accumulator pad 72 is disposed within the inner diameter of the tube 10, forwardly of the rear cap 14, and surrounding the cylinder 20. This accumulator section also has fluid communication with the slot 26.

A sleeve 76 surrounds the outer diameter of the cylinder 20 and has its outer surface in contact with the inner diameter of the accumulator pad 74. The sleeve 76 is locked in position relative to the tube 10 by a pin 78 extending radially inward from the outer wall of the tube and passing through a hole formed in the accumulator pad 74.

Three fluid ports 80, 82, and 84 are formed radially through the wall of the cylinder 20. The three ports are in longitudinal alignment with one another and the spacing between the ports 80 and 82 is greater than the spacing between the ports 82 and 84. More than three ports may be employed in alternative embodiments and generally the spacings are arranged at exponentially decreasing distances in the direction of the rear of the cylinder. The ports are circular in cross-section.

The ports cooperate with three annular grooves 86, 88 and 90 formed on the interior surface of the sleeve 76. These three grooves are spaced along the length of the sleeve 76 at the same spacing as the holes 80, 82 and 84 so that when the sleeve is disposed over the cylinder 20, the grooves lie over the holes. This is illustrated in FIGS. 4 and 5 wherein the grooves and ports are illustrated in hidden lines.

The grooves have a unique shape which is best illustrated in FIGS. 6, 7 and 8. Only the groove 90 is illustrated in FIG. 8 but it is representative of all of the grooves. The grooves each have one sidewall 92 extending normally to the interior diameter surface of the sleeve and terminating in a flat bottom 94 which extends parallel to the interior diameter surface and normally to the sidewall 92. As is best seen in FIG. 7 the depth of the groove varies along the length of the groove. At one point, denominated 96 in FIG. 7, the groove has nearly a zero depth, almost merging with the interior diameter of the sleeve 76. At a diametrically opposed point, indicated at 98, the groove has a maximum depth. The depth of the groove varies linearly along the groove between these two points.

The groove has a second sidewall 100 which is inclined with respect to the interior diameter surface of the sleeve 76 so that the groove is wider at the interior diameter than at the bottom 94. The groove bottom 94 has a constant width along the length of the groove and accordingly the width of the groove at the interior diameter varies linearly along the groove, as is best seen in FIG. 6. Each groove has a radial port 102 formed through its wall at the deepest point of the groove (98, for groove 90).

The maximum constriction in the flow path formed by one of the ports 80, 82 or 84, and its associated groove 86, 88 or 90, respectively, occurs at the interface between the port surface at the outer diameter of the cylinder 20, and the groove surface at the interior diameter of the sleeve 76. The width of this restriction is a function of the rotational position of the sleeve 76 relative to the cylinder 20. FIG. 4 illustrates the sleeve in such a relationship with respect to the cylinder that the entire surfaces of the ports in the cylinder are uncovered by the groove. In this position, the effective orifice area is a maximum. FIG. 5 illustrates the sleeve rotated through 180° so that the minimum depth portions of the groove overlie the ports in the cylinder. In this position the ports are practically closed off. In between these two extreme positions the minimum restriction in the fluid flow path occurs on a line drawn between the circumference of one of the ports in the cylinder and the opposed edge of the groove. This orifice is of effectively zero length.

The radial orientation of the cylinder 20, relative to the sleeve 76, which is fixed within the outer tube 10 by the pin 78, may be adjusted by means of an externally knurled cylindrical adjustment member 112 that may be attached to the rear end cap 14 by a split ring 114. A pin 116 passes through the member 112 to align it in a hole in the end cap 14.

Alternatively, the same adjustment member may be attached to the front end of the bearing retainer 28 through use of ring groove 118 and a pin socket 121. The member 112 may be removed to prevent undesired readjustment of the orifice size. The releasable fastener means comprised of the set screw 22 serves to lock the bearing retainer 28 and cylinder 20 in an adjusted rotational position in the tube 10.

The tube 10 is equipped with a port 106 in its side wall, which communicates with the interior volume adjacent the accumulator pad 72. This port may be plugged so as to restrain the fluid flow within the tube 10 or it may be used to connect the interior volume to an external accumulator 108, via a conduit 110, as illustrated in FIG. 9. This arrangement allows for a more efficient dissipation of the heat induced in the hydraulic fluid as a result of the energy absorbed from the decelerating machine member.

In use, the shock absorber is attached to a machine part 13, by bolts 120 which pass through the flange 12, as illustrated in FIG. 1. The piston is positioned to receive the impact of a moving part 122 and exert a linear decelerating force on the part. During the rearward motion of the piston fluid is forced through the ports 80, 82 and 84 in the cylinder through a metering orifice created by the interaction of the outer diameter of these ports with the adjacent section of the grooves 86, 88 and 90, respectively in the sleeve 76. The ports are successively closed off as the piston moves down the cylinder maintaining the decelerating force relatively constant. The fluid then moves along the groove and passes out of the holes 102 and compresses the accumulator material 72 and 74 or passes out through the port 106 to an external accumulator. When the machine part 122 moves away from the shock absorber, the spring 52 returns the piston to its forward position and the valve in the piston formed by the ball 64 moves against the valve retainer 66 so that fluid can freely flow from the accumulator back into the interior volume of the cylinder.

The asymmetrical ears 24 on the forward end of the tube 20 allow the piston 54 to be inserted in the cylinder without the use of a piston ring holder, in the manner previously described. The asymmetrical ears mate with the asymmetrical slots 26 in the bearing retainer 28 to insure a unique alignment to the assembly.

FIG. 10 illustrates a second, alternative form of the metering sleeve, generally indicated at 130. The sleeve, shown in position with respect to cylinder 20 and the three metering ports, 80, 82 and 84, has a rectangular spiral groove 132 formed on its interior diameter. The lead of the spiral is an integral divisor of the spacings between each adjacent pair of metering ports. That is, the distance between the centers of the metering ports 80 and 82, and the distance between the centers of the metering ports 82 and 84. If additional metering ports are provided in the cylinder 20 at exponentially related distances, the pitch of the spiral 132 should also be an integral divisor of the distance between that additional metering port and the adjacent metering port of the series.

With this constraint placed upon the spacing between the metering ports of the cylinder, it may not be possible to space the metering ports at exactly exponentially related distances, but the number of ports and their positions can be adjusted to provide satisfactory operation with this constraint.

Alternatively the ports need not be in line, but could be displaced radially with respect to one another, so as to align with the spiral groove, or the ports could have different sizes, but be non-exponentially spaced, to achieve the same dynamic effect as exponential spacing.

Because of the relationship between the pitch of the spiral groove 132 and the spacing of the ports, the ports have substantially identical relationships with the portions of the groove adjacent to or overlying each of them. In FIG. 10 the grooves are shown as having a width equal to the diameters of the ports and lying fully over the ports, so as to allow a maximum flow through the ports. As the cylinder 20 is rotated relative to the sleeves the grooves will effectively be shifted longitudinally, relative to the ports, decreasing the effective areas of the orifices. This motion can continue until ports are completely shut-off.

This form of groove is simple to fabricate and provides excellent adjustability.

Holes 134 are formed in the groove wall at regular intervals and provide a flow path to the exterior of the sleeve.

A third, alternative groove design is illustrated in FIGS. 11, 12 and 13.

In FIG. 13 a cylindrical sleeve 140 is shown developed to illustrate a groove 142 having a width that varies linearly over the inner diameter of the sleeve. A radial port 144 is formed through the sleeve 140 at the widest point of the groove 142.

The grooved sleeve of FIG. 13 is shown in FIG. 11 abutting a cylinder 146 in a first rotational relationship that provides maximum flow through a metering port 148 into the groove 142. The groove is formed with one sidewall 150 extending normally to the interior diameter of the sleeve and in alignment with one side of the metering port 148. The sidewall 150 terminates at its inner end in a flat bottom 152 which extends parallel to the inner diameter surface and normally to the sidewall 150. The flat bottom 152 is generally of a width greater than the diameter of the metering port 148. A second sidewall 154 extends normally to the flat bottom 152 and parallel to the first sidewall 150 over a portion of the depth of the groove.

A knife-edge projection 156 adjoins the second sidewall 154 and juts toward the first sidewall 150 to define an orifice 158. The projection 156 varies linearly in width over the inner diameter of the sleeve 140. At one extreme, as represented by FIG. 11, the projection terminates immediately adjacent the right side of the metering port 148 to define an orifice 158 of maximum area.

At the other extreme, as represented by FIG. 12, the sleeve has been rotated 180° with respect to the cylinder 146, and the knife-edge projection 156 terminates adjacent the left side of the metering port 148 to define an orifice 158 of minimum area. The orifice area can thus be varied through an infinite number of settings between the extremes of FIGS. 11 and 12 by rotating the sleeve 140 with respect to the cylinder 146.

The orifice 158 defined by the groove configuration of FIGS. 11–13 has virtually zero length to provide a minimal length-to-width ratio. This feature tends to create a highly turbulent flow through the orifice, making the flow independent of fluid viscosity, and thus, of fluid temperature.

In addition, at any point over the inner diameter of the sleeve 140 the groove 142 has a greater cross-sectional area than the area of the orifice 158. This feature assures that fluid in the groove 142 will be relatively "depressurized". By reducing fluid pressure in the groove, the likelihood of leakage flow from the groove into the tolerance between the sleeve 140 and cylinder 146 will be minimized.

FIG. 14 illustrates a comparison between the present invention and prior art devices in this respect. The solid lines represent the pressure of the fluid in the groove of a shock absorber formed in accordance with the present invention; the dashed lines represent the same for a typical prior art groove design. In the illustration, $\theta$ is defined as the angle at which the sleeve is rotated with respect to the cylinder away from a minimum orifice setting. As $\theta$ is increased, the angular distance from the orifice to the exhaust port is, of course, decreased proportionately.

In the case of $\theta = 0°$, the fluid pressure in a groove of the present design drops suddenly in an almost step-like fashion. The fluid pressure in the prior art groove design decreases much more gradually over the length of the groove. The relative "pressurization" of the prior art groove heightens the likelihood of fluid leakage from the groove into the tolerance space between the sleeve and cylinder.

In the case of $\theta = 60°$, the situation is similar to before, but with the pressure drop being less marked. However, the fluid pressure in the prior art groove is significantly higher at any angular position over the groove length. This again points out the advantage of the present groove design.

The embodiments of the invention in which an exclusive property or privilege is claimed are defined as follows:

1. A fluid shock absorber for providing a constant decelerating force to a moving member, comprising: an outer tube; a bearing retainer rotatably supported within one end of the tube; a piston rod slidable axially within the tube on said bearing retainer; a piston supported on the rod within the tube; a piston ring extending about the outer diameter of the piston; an inner cylinder rotatably supported at the other end of the tube; an outer sleeve surrounding said cylinder and rotatably fixed within said tube; apertures formed in the cylinder and the sleeve operative to form fluid orifices connecting the interior of the cylinder to the exterior of the sleeve, the apertures being so arranged that the rotational position of the sleeve relative to the cylinder controls the configuration of the orifices; eccentric engaging means formed on the adjacent ends of the bearing retainer and the inner cylinder operative to lock the two in rotational alignment with one another with respect to the tube; said eccentric engaging means comprising a pair of asymmetric tabs extending endwise from two circumferentially spaced points on the end of the cylinder which abuts the bearing retainer, said tabs being displaced on the same side of a diametric line across said cylinder to provide said asymmetry, said tabs having inner surfaces in alignment with the inside diameter of said cylinder to provide a guide surface to guide said piston and piston ring into said cylinder at assembly; removable adjustment means attachable to the cylinder and bearing retainer assembly for adjusting the rotational position of the cylinder relative to the sleeve to control the sizes of the orifices through the sleeve and the cylinder; and releasable fastener means extending through the tube for locking the cylinder and the bearing retainer in an adjusted rotational position relative to the tube.

* * * * *